(12) United States Patent
Roberts (10) Patent No.: US 7,165,015 B2
(45) Date of Patent: Jan. 16, 2007

(54) HANDHELD DEVICE FOR RETRIEVING AND ANALYZING DATA FROM AN ELECTRONIC MONITORING DEVICE

(75) Inventor: William Peyton Roberts, Spartanburg, SC (US)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 11/093,070

(22) Filed: Mar. 29, 2005

(65) Prior Publication Data

US 2006/0229850 A1    Oct. 12, 2006

(51) Int. Cl.
*G06F 3/042* (2006.01)
(52) U.S. Cl. .................. 702/188; 702/183; 702/186; 702/187
(58) Field of Classification Search ........... 702/117, 702/122, 123, 130, 150, 183, 187; 235/375, 235/376; 340/588; 709/224
See application file for complete search history.

(56) References Cited

U.S. PATENT DOCUMENTS

| | | | |
|---|---|---|---|
| 5,313,848 | A | 5/1994 | Santin et al. |
| 5,442,669 | A | 8/1995 | Medin |
| 5,770,841 | A | 6/1998 | Moed et al. |
| 5,796,222 | A | 8/1998 | Grodevant |
| 6,185,513 | B1 | 2/2001 | Plettner et al. |
| 6,275,931 | B1 | 8/2001 | Narayanaswamy et al. |
| 6,411,916 | B1 | 6/2002 | Pellerin |
| 6,563,417 | B1 | 5/2003 | Shaw |
| 6,571,188 | B1 | 5/2003 | Clarridge et al. |

(Continued)

FOREIGN PATENT DOCUMENTS

WO    WO 2005/017476    2/2005

OTHER PUBLICATIONS

Cold Chain Consignment Monitoring Service, CarterHoltHarvey; http://www.glandi.com/x_Tract.htm.

(Continued)

*Primary Examiner*—Marc S. Hoff
*Assistant Examiner*—Felix Suarez
(74) *Attorney, Agent, or Firm*—Alston & Bird LLP (57) ABSTRACT

The invention is a handheld device that is adapted for wireless communication with an electronic monitoring device, and includes a control unit and dedicated operating system configured to analyze data retrieved from a data logger and determine if the electronic monitoring device has been exposed to an environmental condition exceeding a predetermined threshold. In some embodiments, the handheld device may be configured to generate a sensory output if the data indicates that the predetermined threshold may have been exceeded. The handheld device may also have an associated memory component configured to store the retrieved data. In some embodiments, the reader may also be configured to calculate the remaining shelf-life of an item that is in a monitoring relationship with the electronic monitoring device.

28 Claims, 10 Drawing Sheets

U.S. PATENT DOCUMENTS

| | | |
|---|---|---|
| 6,617,963 B1 | 9/2003 | Watters et al. ........... 340/10.41 |
| 6,728,391 B1 | 4/2004 | Wu et al. |
| 6,837,095 B1 * | 1/2005 | Sunshine et al. ............ 73/23.2 |
| 6,840,796 B1 | 1/2005 | Marcinkiewicz et al. |
| 6,950,028 B1 * | 9/2005 | Zweig ........................ 340/588 |
| 2002/0082787 A1 | 6/2002 | Woodworth et al. .......... 702/81 |
| 2002/0152305 A1 * | 10/2002 | Jackson et al. ............. 709/224 |
| 2003/0006907 A1 | 1/2003 | Lovegreen et al. .... 340/870.16 |
| 2003/0150908 A1 * | 8/2003 | Pokorny et al. ............ 235/375 |
| 2003/0167380 A1 | 9/2003 | Green et al. |
| 2005/0009122 A1 | 1/2005 | Whelan et al. |
| 2005/0038581 A1 * | 2/2005 | Kapolka et al. .............. 701/29 |
| 2005/0262221 A1 * | 11/2005 | Daniels et al. ............. 709/219 |

OTHER PUBLICATIONS

Swedberg; "Tags with Sensors Track Produce," RFID Journal; http://www.rfidjournal.com/article/articleview/1253/1/1/.

Consignment Monitoring Service; http://www.exago.net/consignment_service.hrm.

Search Report and Written Opinion for PCT/US2006/011136 dated Jul. 7, 2006.

* cited by examiner

HANDHELD DEVICE FOR RETRIEVING AND ANALYZING DATA FROM AN ELECTRONIC MONITORING DEVICE

BACKGROUND OF THE INVENTION

The invention relates generally to electronic monitoring devices and more particularly to handheld devices that are configured for retrieving and analyzing data from an electronic monitoring device.

Electronic monitoring devices are used in a wide variety of applications to record and monitor various conditions and events. Monitoring conditions such as temperature is important in many industries involving products that are sensitive to specific conditions. In particular, electronic monitoring devices have found increasing use in the food and pharmaceutical industries to record and monitor conditions under which items such as perishable goods have been shipped and/or stored.

Data loggers are portable electronic monitoring devices that can record measurements such as temperature, relative humidity, light intensity, on/off, open/closed, voltage, pressure, and events over time. Typically, data loggers are small, battery-powered devices that are equipped with a microprocessor, data storage and sensor. Data loggers may be programmed to take specific measurements at desired time intervals.

Data loggers may be activated or programmed by connecting them to a computer that can be used to send and retrieve data to and from the data logger. Data loggers can also be activated by manual operation, such as a switch or push button. After the data logger has been activated it is usually positioned or deployed in a desired location for data gathering. The logger records each measurement and stores it in memory. The loggers can typically also record the date and time at which the measurement was taken. At a desired time, the data contained within the data logger is retrieved by reconnecting the data logger to a computer or similar device.

. Some data loggers employ radio frequency identification (RFID) communication protocols to activate, program, and send or retrieve data to and from the data logger. The use of RFID technology in electronic monitoring devices allows the stored data to be quickly retrieved from the devices. For instance, an RFID reader in communication with a computer can be used to activate and retrieve data from a data logger at a various points throughout the distribution system. To retrieve the information, the data logger may be connected to a computer or brought into close proximity with an RFID reader. In some circumstances, it may be desirable to retrieve and analyze information from the data logger at various points throughout the distribution system. Unfortunately, it may not always be convenient to connect the data logger to a computer for data analysis. In other cases, the reader may only be able to retrieve the data and real time analysis may not be available.

Thus, there still exists a need for a low cost device that can be used for real time retrieval and analysis of data from a data logger device.

BRIEF SUMMARY OF THE INVENTION

In one alternative embodiment, the invention is a handheld device ("reader") comprising a first interface that is adapted for wireless communication with an electronic monitoring device, such as a data logger, a control unit and dedicated operating system configured to analyze data retrieved from a data logger, a user interface adapted for operation of the handheld device, an output device capable of generating a sensory output, an associated memory component configured to store data retrieved from a data logger, and a second interface that is adapted to transfer the stored data to an external computer. In some embodiments, the dedicated software comprises executable program modules that may be solely dedicated to the retrieval, analysis, and the display of data from the electronic monitoring device. The reader may also be configured to determine if the electronic monitoring device has been exposed to environmental conditions exceeding a predetermined threshold, and to generate an alarm signal if the data indicates that the predetermined threshold may have been exceeded. In some embodiments, the reader may also be configured to calculate the remaining shelf-life of an item that is being monitored by the electronic monitoring device.

In some embodiments, the executable program modules may be embedded in the control unit or its associated memory. In some embodiments, the dedicated operating system may include program modules consisting essentially of modules configured for the retrieval, analysis, display, storage, and transfer of the retrieved data. In one embodiment, the reader may be configured to analyze the data in real time. As a result, the reader may be adeptly suited for monitoring the conditions to which an item may have been exposed throughout a distribution system. Since the reader and its internal components are solely dedicated to the analysis of data retrieved from an electronic monitoring device, the costs associated with the reader may be less than with other computing devices, such as a handheld computer (Personal Digital Assistant or PDA).

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention is shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Figure 1:
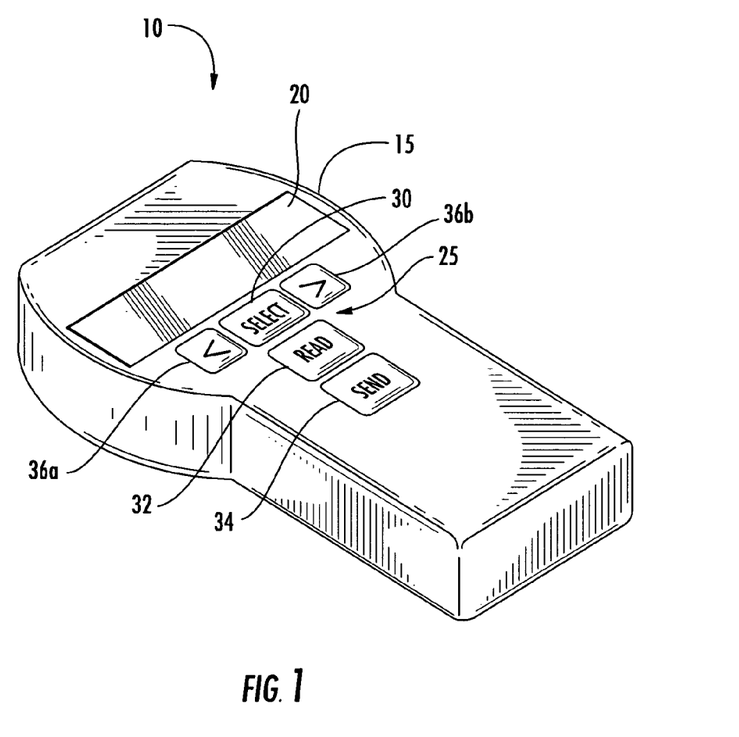
FIG. 1 is a graphical illustration of a handheld device for retrieving, analyzing, and transmitting data from an electronic monitoring device.

With reference to FIG. 1, a handheld device for retrieving and analyzing data from an electronic monitoring device, such as a data logger, is illustrated and broadly designated as reference number 10. In some embodiments, the handheld device, also referred to as a "reader," is capable of performing real-time analysis of the data retrieved from an electronic monitoring device. The reader may also be configured to generate a sensory output to alert the user if a monitored condition may have exceeded a predetermined threshold. In the context of the invention, real time analysis refers to the ability of the reader to retrieve and analyze data from an electronic monitoring device in a single step without having to first download the data to an external computer such as a personal computer (PC), PDA, and the like.

Electronic monitoring devices that may be useful in the invention include small portable electronic devices, such as data loggers, that can be programmed to collect and record specific measurements. The electronic monitoring devices (EM devices) are typically battery powered and may comprise a microprocessor, instruments for taking measurements, and recordable storage medium for storing data. Typical measurements include, for example, temperature, relative humidity, light intensity, on/off, open/closed, voltage, pressure, and events over time. In some embodiments, the EM devices can be about the size and shape of a "credit card." Card shaped EM devices can be deployed in a wide variety of applications where small size may be desirable. The EM devices in some embodiments may be reused multiple times.

The EM device typically includes a radio frequency (RF) transceiver that can wirelessly send and receive data between the EM device and a reader. The EM device can also include a radio frequency identification (RFID) communication means or interface that can enable wireless communication with the EM device. EM devices that are useful in the invention are typically adapted to monitor and record a wide variety of conditions including, but not limited to, temperature, humidity, pressure, on/off cycles, and the like. EM devices can be activated in wide variety of ways. In some embodiments, the EM device may be manually activated by pushing a button or triggering a switch. In other embodiments, the EM device can be activated through wired or wireless communication with a computer or reader, such as a RFID reader. Exemplary EM devices are described in U.S. Pat. Nos. 5,313,848; 6,320,512; and 6,411,916. An exemplary EM device is produced under the trade name TempSens® by KSW Microtec.

EM devices may be used to monitor environmental conditions such as temperature exposure of a wide variety of items including, but not limited to, pharmaceuticals, food products such as meats, produce, and dairy products, electronics, chemicals, cosmetic products, biological products, and the like. An item that is to be monitored includes not only individual items such as a package, box, or pallet-load, but can also include collections of more than one type of item.

Referring back to FIG. 1, the handheld device ("reader") 10 includes a housing 15 that may be configured to be portable and easily supported by a user. The housing 15 may comprise a material that is lightweight and strong, such as a thermoplastic material. As shown in FIG. 1, the housing may include a user interface having one or more buttons or switches 25 that may be configured to allow a user to input instructions and select among various menu options. In some embodiments, the buttons 25 may comprise a touch sensitive keypad that allows a user to operate the device by applying pressure to a button within the keypad.

In some embodiments, the reader may also include a means for generating a sensory output to the user. The sensory output may be used to alert a user if the retrieved data indicates that a monitored condition has exceeded a predetermined threshold and/or if the shelf-life of the item has expired. In some embodiments, the sensory output may also by used to indicate the status of the reader, which may include whether the EM device has been successfully read by the reader, reader power status, low memory capacity, and the like. As shown, in FIG. 1 the sensory output may include visual outputs, audible outputs, and combinations thereof. In one embodiment, the sensory output may be generated by an output device in the form of a visual display 20, such as a LCD display. In some embodiments, the visual display may be adapted to display device status, operational mode, data retrieved from a data logger, and the like. The reader may also include an output device that is capable of producing an audible output that may be used in lieu of, or in combination with, a visual display. In some embodiments, the reader may be configured to generate both a visual output and an audible output if the predetermined threshold has been exceeded.

The reader may include at least one button that is adapted to instruct the device to retrieve data from the data logger and at least one button that is adapted to transmit stored data to an external computer. In one embodiment, the reader includes a "READ" button 32 adapted for instructing the data logger to communicate with the EM device; a "SEND" button 34 that is adapted for instructing the reader to download the stored data to an external computer; a "SELECT" button 30 that is adapted to select an option or operational mode of the reader; and left and right arrow buttons 36a, 36b that are adapted to allow a user to scroll between several menu options. In some embodiments, one of the buttons, such as the "SELECT" button, may also be configured for turning the reader on and off.

Figure 2:
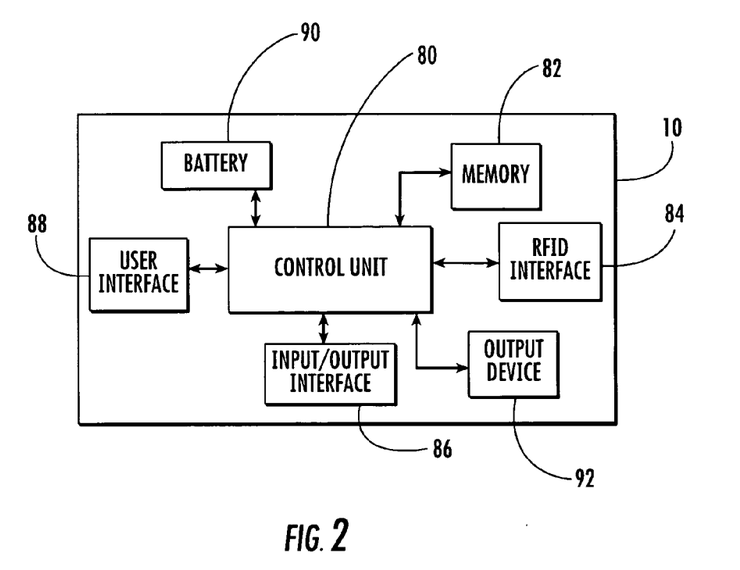
FIG. 2 is a graphical illustration depicting the internal components of the handheld device.

With reference to FIG. 2, the internal components of the reader 10 are illustrated. The reader may include a control unit 80, a memory component 82, a first interface 84 that may be adapted for wireless communication with an EM device, such as an RFID interface, a user interface 88, a second interface adapted for communicating with an external computer 86, such as an input/output interface, a power supply such as a battery 90, and an output device 92 that is capable of generating a sensory output. As shown in FIG. 2, the interfaces, processor, memory, output device, and battery are typically operatively connected to one another.

In some embodiments, the first interface 84 may include a RFID transceiver that is adapted to allow the reader to retrieve data from an EM device. In some embodiments, the RFID communication interface may also be adapted to reprogram or send instructions to the EM device. The RFID transceiver may perform read only or read-write communications depending on the application.

The second interface 86 may be adapted to send and retrieve data from an external computer or database. In some embodiments, the second interface may include input/output (I/O) interface. The I/O interface may comprise wired or wireless connectivity means such as I2C, ACCESS.bus, RS-232, universal serial bus (USB), IEE-488(GPIB), LAN/Internet protocols such as TCP/IP, wireless means such as infrared (IR) communication, 802.11x, and Bluetooth, etc.

In some embodiments, the I/O interface may comprise a combination of wired and wireless connectivity means.

As discussed above, the user interface 88 may include a touch sensitive keypad having one or more buttons that are adapted to allow a user to input operational instructions into the reader.

The control unit 80 may be in the form of an embedded system comprising a microprocessor or microcontroller configured to perform dedicated functions such as controlling the reader and executing program modules that are capable of analyzing the data. As used herein, the term "microcontroller" refers to a microprocessor on a single integrated circuit intended to operate as an embedded system. The microcontroller may also include memory components such as RAM, EEPROM, and PROM, internal timers, and I/O port interfaces. The control unit may include an internal memory component (not shown) that may be an integral part of the control unit. In some embodiments, the control unit may include executable program modules embedded within the internal memory component of the control unit.

The associated memory component 82 typically comprises a memory that is configured to buffer data retrieved from an EM device, such as flash memory. Flash memory refers generally to a type of nonvolatile memory that can be erased and reprogrammed in units of memory called blocks. The capacity of the memory component can be varied depending upon the desired amount of data that can be stored before downloading the data into an external computer or similar device. In some embodiments the capacity of the associated memory component may comprise 64K, 128K, 256K, or 512K memory blocks.

In some embodiments, data uploaded from the EM devices may be stored in the associated memory component in its native format, and is not converted into a standard data file format, such as ASCII text, until the data has been downloaded into an external computer. According to this embodiment, a software program may operate on the external computer as it retrieves data from the reader 10, and this software program would carry out the conversion of the retrieved data from native format to one or more standard file formats. In the context of the invention, "native format" refers to a compressed data format derived from the storage format of the EM device, and not recognized by multi-function software applications such as database, text editing or spreadsheet programs. "Standard file format" refers to a file format that is recognized by multi-function software applications such as database, text editing, or spreadsheet programs and the like. In some embodiments, the associated memory component stores the retrieved data until it is downloaded to an external computer, or until the memory capacity of the associated memory component has been exceeded.

The reader in some embodiments may be bundled with a software program that may be configured to analyze data transferred from the reader to an external computer. The software program may be stored on a storage medium such as a CD-ROM, or may also be available for downloading via the Internet. The software program may include modules for creating and defining directory files for the transferred data and converting data retrieved from the reader from a native file format to a standard file format. The software program may also be configured to control the retrieval of data from the reader after a communication link between the reader and the computer has been established. The software program may also be configured to send an operational command to the reader that instructs the reader to signal to the user when the data transfer has been completed.

In some embodiments, the reader of the invention includes a dedicated operating system. In the context of the invention a "dedicated operating system" refers to one or more fixed routines, such as a program module, that may not normally be alterable by the user and that are capable of instructing the reader to perform commands or operations associated with the retrieval, analysis, sensory output of the analysis, storage, and transfer of data retrieved from an EM device. Such commands or operations may include retrieving data from an EM device, analyzing the retrieved data, generating a sensory output based on the data, calculating the remaining shelf-life of a monitored item, storing the data, and transferring the stored data to an external computer. In some embodiments, the dedicated operating system may consists essentially of programs modules that are configured to instruct the reader to perform one or more of retrieving data from an electronic monitoring device, analyzing the retrieved data, generating a sensory output based on the data, storing the data, transferring the stored data to an external computer, and enabling a user to select an operational mode of said handheld device. In some embodiments, the program modules directed to analysis of the data may include one or more program modules that are capable of calculating the remaining shelf-life of an item. The overall cost of the reader of the invention may be less than the cost of a PDA having a standard operating system, and the complexity of setup and operation may also be reduced. As a result, the reader may help provide a cost effective handheld device that can be utilized to retrieve and perform real time analysis on data retrieved from an EM device.

The reader 10 of the invention may be characterized by the absence of a standard operating system. Within the context of the invention, a "standard operating system" refers to software or software combination with no pre-specified function, and enabling the end user to update software and hardware peripheral devices to perform one or more of several processes with the same device. Examples of standard operating systems include commercially available or proprietary computing platforms (e.g., a PC architecture running Windows, Linux, or a similar operating system). A Personal Digital Assistant (PDA) is an example of device that may have a standard operating system.

As discussed above, the reader may include one or more executable program modules that are embedded within the control unit or associated memory component. The embedded program modules may be configured to operate the functions of the reader and facilitate communications between the various interfaces and the control unit. Such embedded program modules may also be in the form of firmware. The term "firmware" generally refers to program modules that are permanently embedded onto a piece of hardware in order to control the hardware and that may comprise fixed routines that are not normally alterable by the user. It should be recognized that in some embodiments, the program modules may be stored in the associated memory component 82 provided that the program modules do not include a standard operating system or equivalent thereof.

The embedded program modules may include modules for facilitating communications between the various interfaces, the control unit, and the associated memory component. The program modules may also include modules that allow a user to configure the reader to a user's preference. The program modules also include programs configured for receiving data; analyzing the data; generating a sensory output; storing the data; and transferring the data to an external computer. In some embodiments, the program module for analyzing the data may comprise a pre-defined algorithm configured to receive an exposure history from an EM device and to determine whether the EM device has been exposed to an exposure event that has exceeded a predetermined threshold. The data retrieved from the EM device may be used to determine the time of occurrence and duration of any possible exposure event. In the context of the invention, an "exposure event" refers to an instance where the monitored conditioned may have exceeded a predetermined minimum or maximum for the particular item being monitored.

The pre-defined algorithm may comprise an algorithm that is configured to analyze the retrieved data to determine if the item being monitored has been exposed to an environmental condition exceeding a predetermined threshold. In some embodiments, the pre-defined algorithm includes a mathematical equation that compares the pre-determined threshold to the environmental conditions to which the item has been exposed, based on the data retrieved from the EM device. In some of the embodiments, the pre-defined algorithm may be configured to determine if an exposure event has occurred based on the total time the item may have been exposed to an environmental condition exceeding the pre-defined threshold. In other embodiments, the pre-defined algorithm is configured to retrieve an initial shelf life, actual time-temperature exposure data, and a series of temperature-dependent shelf life calculation parameters from the EM device, perform an iterative calculation of remaining shelf life based on multiple time-temperature exposure data points, and compare the result of this calculation with a user-defined minimum shelf life value that is stored in the reader.

The EM device may also include information which is used in determining if the monitored environmental condition has exceeded a predetermined threshold. This information may include an exposure history for the item being monitored and what level or degree of exposure is necessary to generate an alarm signal. An exposure history refers to a collection of sequential data points in which the EM device records an environmental condition, such as temperature, over a period of time. The exposure history may include the value of one or more environmental conditions being monitored and the duration of time the item has been exposed to the environmental condition. For example, in temperature monitoring, the exposure history will periodically record the temperature readings as a function of time. The EM device may also include information for the particular item being monitored that allows the pre-defined algorithm to determine if the exposure history may have exceeded a predetermined threshold. Such information may include calculation parameters such as the initial or default shelf-life for the item, spoilage behavior of the monitored item including information for calculating if the duration of exposure is too great, the predetermined threshold value for the monitored condition, such as, for example, the maximum or minimum acceptable temperature to which the item may be exposed, the length of time the data logger has been tracking environmental conditions, and the like.

The information retrieved from the reader may also include data relevant to determining the remaining shelf-life of the item. The shelf-life of an item refers to the length of time that a product can be stored before there is a possibility of deteriorating quality or running a risk of health hazard. An item may be considered expired after its shelf-life has been depleted. In some embodiments, the shelf-life may be calculated in days. Shelf-life may be dependent upon the nature of the item itself, the age of the item, the environmental conditions to which it has been exposed, and the duration of any such exposure. Many items may have a default shelf-life for a certain amount of days when stored under certain environmental conditions, such as temperature. The default shelf-life refers to the expected shelf-life of an item when stored under certain predefined environmental parameters. In some cases, the default shelf-life can be shortened depending upon the environmental conditions to which the item has been exposed. For example, in some circumstances, the temperature to which an item has been exposed may exceed a desired value for the item. The resulting shelf-life may be affected by the duration and magnitude of the exposure. If the duration of the exposure is for a brief period of time, and the magnitude is relatively small, the shelf-life may only be minimally affected. In some cases, a short duration may cause the shelf-life to expire if the magnitude is significant. In some embodiments, the EM device may include shelf-life information about the item being monitored and the relevant exposure history to which the product has been exposed that will allow the reader to determine the remaining shelf-life of the item. If the shelf-life has expired, the handheld device may be configured to generate a sensory output, such as an alarm signal, that indicates to the user that the shelf-life may have expired. In the context of the invention, an alarm signal refers to a visual or auditory response generated by the control unit in the event the data indicates that the predetermined threshold may have been exceeded or that the shelf-life may be expired. In some embodiments, the visual display 20 (see FIG. 1) is capable of displaying the remaining shelf-life of the item.

In some embodiments, a user may be able to configure the reader to include a shelf-life preference for the item. In this embodiment, the user may desire that the item has a minimum shelf-life. The user can enter this minimum shelf-life into the handheld device. The reader may calculate the remaining shelf-life of the item based on the exposure history of the product and the information regarding the predetermined threshold for the item being monitored. Next, the control unit will calculate the shelf-life remaining based on the user's desired minimum shelf-life. If the calculated shelf-life is less than or equal to the user's desired shelf-life, the reader may generate an alarm to signal that the remaining shelf-life is below the desired minimum. The alarm may be in the form of an audible output, visual output, or a combination thereof.

If the reader determines that an exposure event has occurred or that the shelf-life of the item has been depleted, the item can be processed as rejected. There are a variety of different actions that can be taken with respect to a rejected item. For instance, the rejected item can be returned to the point of origination, such as a supplier, the item can be held for a subsequent investigation, the item could be sold at a discounted price, positioned so as to receive expedited sale or delivery and/or extra cold storage, or the item could be disposed or discarded. As described above, the stored temperature readings may also be used to determine the time of occurrence of temperature exposure events on the item so that appropriate action may be taken.

Figure 3:
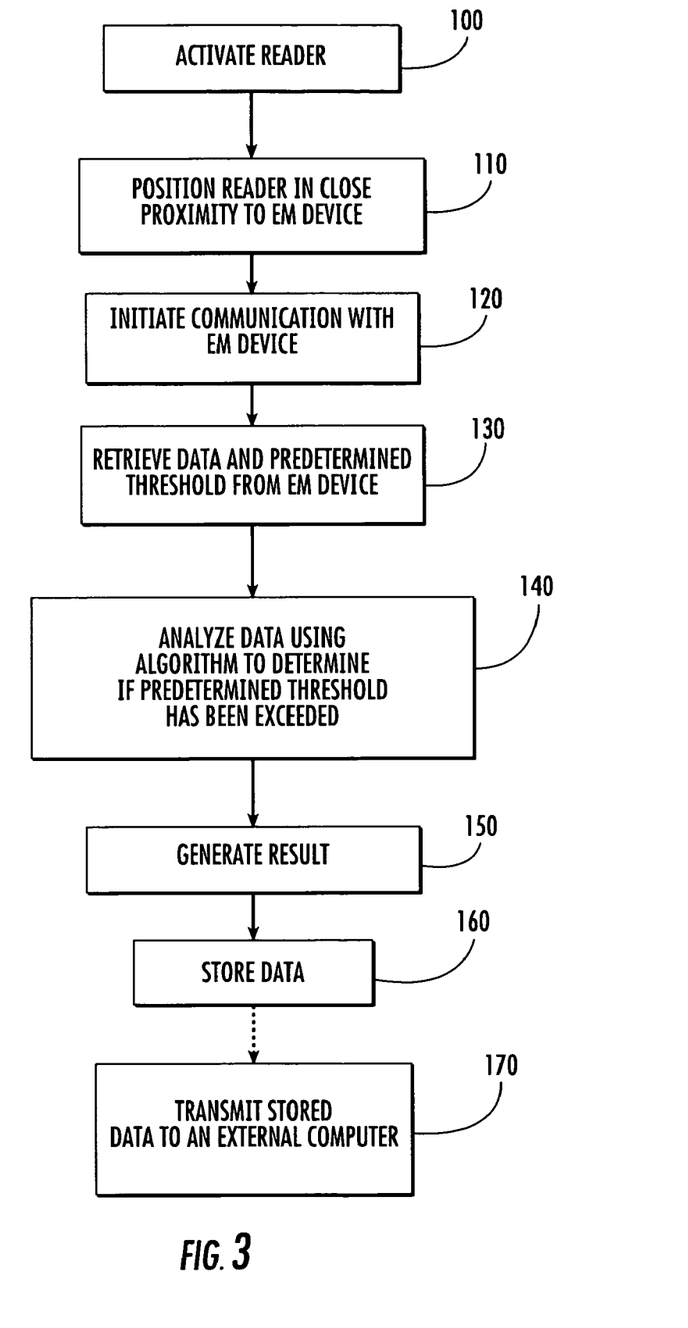
FIG. 3 is a flow chart representing the flow of data through the handheld device.

With reference to FIG. 3, a block diagram representing the operation of the reader in one embodiment is illustrated. In the first step 100, the reader is activated. Once activated, the reader is positioned in close proximity to an EM device at step 110. The reader initiates wireless communications with the EM device at step 120. Next, the reader retrieves the data recorded on the EM device at step 130. The data is then communicated from the RFID interface to the control unit. At step 140 the control unit uses a pre-defined algorithm and the retrieved data to determine if the monitored condition has exceeded a predetermined threshold. In the next step 150, the reader generates a response. If the exposure history indicates that the condition may have exceeded the predetermined threshold, an alarm signal may be generated. In some embodiments, the alarm signal may comprise a visual or audible output. If the predetermined threshold has not been exceeded the reader may generate a response indicating the acceptability of the goods. In some embodiments, the reader may calculate and display the remaining shelf-life of the monitored item. The retrieved data may be stored in the associated memory at step 160. It should be understood that the order of the storage step 160 and the analysis step 140 is not critical and can be performed simultaneously or in any order. At a desired time, the stored data can then be transmitted to an external computer in step 170. In some embodiments, the reader is adapted to store data from multiple EM devices before the data is transferred to an external computer.

Figure 4:
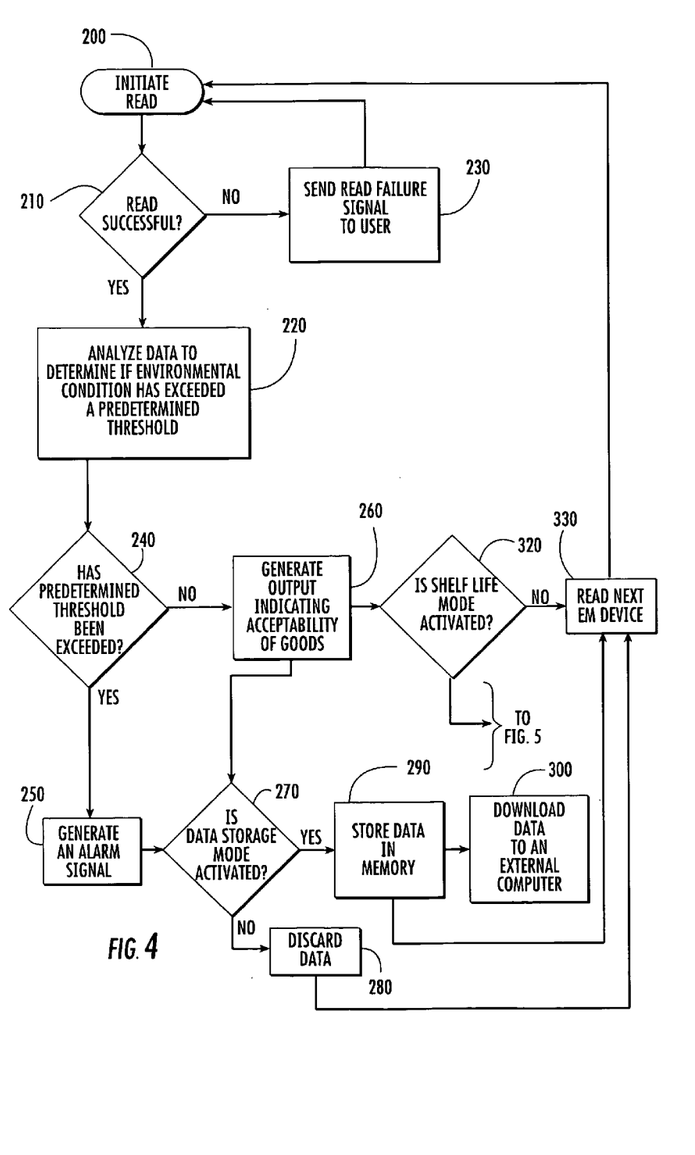
FIG. 4 is a flow chart representing the steps performed by the handheld device in retrieving and analyzing the data retrieved from an electronic monitoring device.

With reference to FIG. 4, a block diagram representing an exemplary flow of data through the reader is illustrated. In the first step 200, a user initiates reading the EM device by activating a first input (e.g., "READ" button). At step 210, the reader may be configured to determine if the EM device has been successfully read by the reader. If the read is unsuccessful 230, the reader may send a signal to the user indicating that the handheld device was unable to read the EM device. In some embodiments, the reader may then prompt the user to re-attempt reading the EM device. If the reader has successfully established communication with the EM device, the RFID interface may then begin uploading the data and any accompanying calculation parameters, such as the predetermined threshold. The retrieved data is then analyzed by the control unit at step 220 with a pre-defined algorithm. In some embodiments, the pre-defined algorithm determines whether the environmental condition has exceeded a predetermined threshold at step 240. In some embodiments, at step 250 the reader may be configured to generate an alarm signal if the analysis indicates that the predetermined threshold has been exceeded. If the predetermined threshold has not been exceeded, the reader may be configured to generate a sensory output indicating the acceptability of the item at step 260. In some embodiments, the reader may be configured to store the data retrieved from the EM device. In step 270, if the reader is configured to store the data, the data is stored in the associated memory component of the reader at step 290. If the reader is not configured to store the data, the data may be discarded at step 280. After the data is discarded or stored in steps 280, 290, respectively, the reader is ready to read the next EM device at step 330. The process may now begin again. At a later time, after completion of the above processes, the stored data from one or more EM devices may be downloaded to an external computer via a second user input (e.g., "SEND" button) at step 300. In some embodiments, the algorithm may be configured to automatically analyze the data to produce at least one result based on the retrieved data, generate a sensory output based on the at least one result, and store the data and the result in the associated memory.

In some embodiments, the reader may be configured to determine the remaining shelf-life of an item being monitored. At step 320, the control unit determines if the reader is configured to calculate the remaining shelf-life of the item. If the shelf-life mode is not activated, the reader is ready to read the next EM device at step 330. If the shelf-life mode is activated, the reader may go to the next step in FIG. 5.

Figure 5:
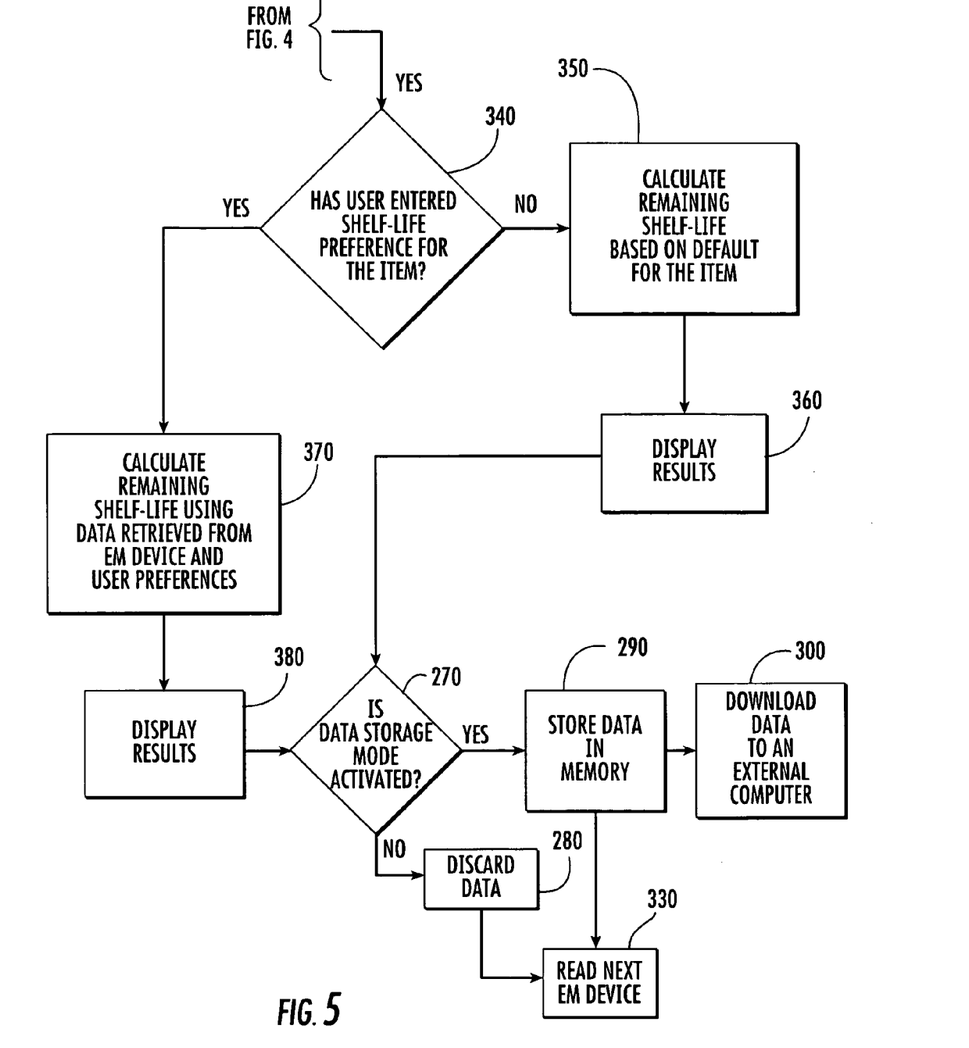
FIG. 5 is a flow chart representing the steps performed by a handheld device that has been configured to calculate the remaining days of shelf-life for a product being monitored.

With reference to FIG. 5, a block diagram representing the flow of data through a reader capable of determining the remaining shelf-life of the item is illustrated. In step 340, the control unit determines if the user has configured the device to calculate the remaining shelf-life based on a user's minimum shelf-life preference. As discussed above, in some embodiments, the user may be able to specify a desired minimum shelf-life for the item. If the user has not entered a minimum shelf-life, the shelf-life may be calculated at step 350 based on a default shelf-life for the item. The parameters for calculating the remaining default-shelf life for the item may be included in the data that has been retrieved from the EM device. The remaining default shelf-life for the item may be displayed at step 360. If the user has entered a minimum shelf-life, the control unit at step 370 will use the recorded exposure history of the item along with the user's shelf-life preference to determine whether the minimum shelf-life as specified by the user has been depleted. The reader will then display the remaining shelf-life of the item at step 380. The reader may be configured to store data including the calculations pertaining to the remaining shelf-life of the item being monitored. As in FIG. 4, the reader may then determine if data storage mode is activated and repeat the steps for storing or discarding the data that are discussed above. It should be recognized that the reader may be configured to perform the steps of displaying the results and storing the data concurrently or in subsequent steps, and that the timing or sequence of each step is not critical to the practice of the invention.

Figure 6A:
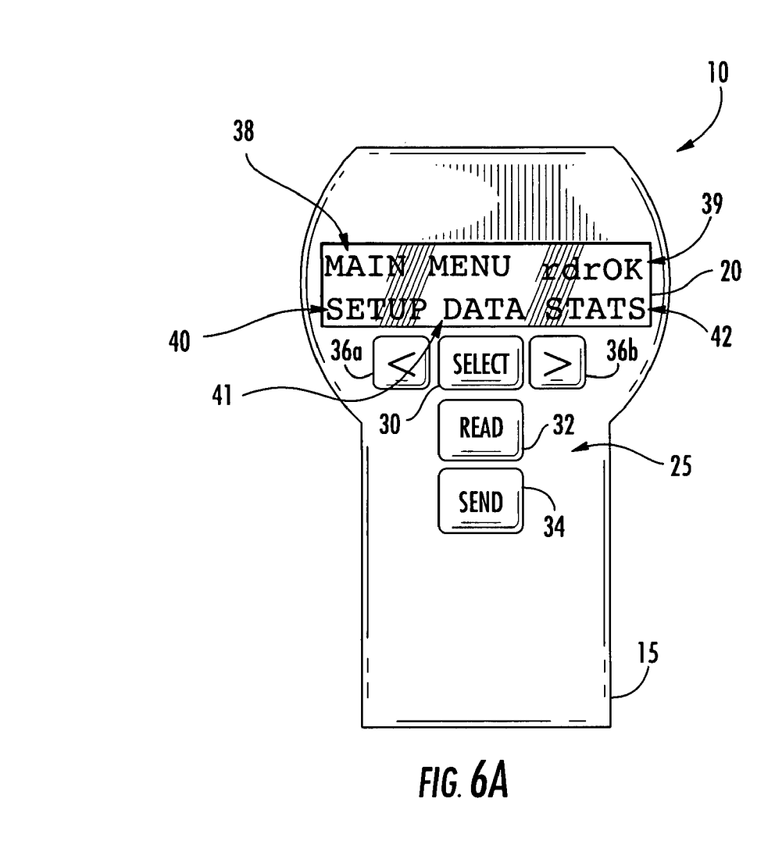
FIGS. 6A through 6E are graphical illustrations depicting exemplary display screens for the handheld device.
Figure 6B:
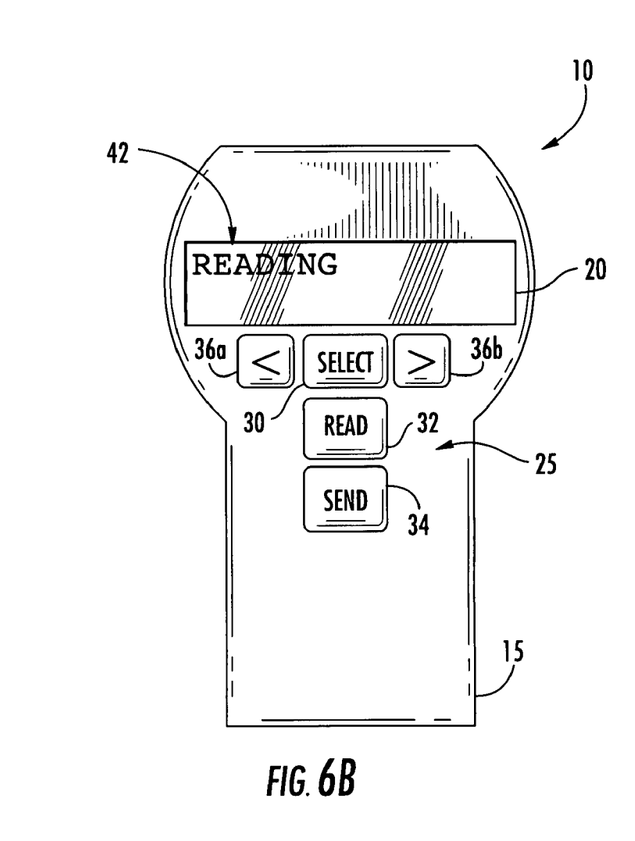

With reference to FIGS. 6A through 6E, exemplary display modes and menu options for the reader are illustrated. FIG. 6A illustrates a reader having an exemplary main menu visual display. As shown, the main menu in some embodiments may comprise a setup mode 40, data mode 41, and stats mode 42. In this embodiment, a user can use arrow buttons 36a, 36b to move among the various modes and options. In some embodiments, the select button 30 can be used to select a displayed mode or option. The visual display may also be configured to indicate the status of the reader including low battery, operational status, and the like. In this regard, FIG. 6B illustrates a reader 10 in the process of reading an EM device.

The setup mode 40 may allow the reader to be configured to a user's preferences. Possible configurations may include, but are not limited to, selection of time zone for the reader; daylight saving mode, memory storage overwrite; sound volume level; auto save mode including whether the reader will automatically save the data for each EM device scanned or only for EM devices that generate an alarm. In some embodiments, the reader may be configured to allow a user to select between whether the reader may generate an alarm signal based on the mean kinetic temperature (MKT) or the average temperature exposure to which the product has been exposed. MKT is defined as a calculated, fixed temperature that simulates the effects of temperature variation over a period of time. MKT is commonly used to account for the effect of time-temperature exposure on the shelf-life of an item, such as a pharmaceutical product. The use of MKT for determining if an alarm signal should be generated may be beneficial in monitoring circumstances where the degree of the exposure, based on length and magnitude, is important in calculating if an exposure event has occurred. In some embodiments, the reader may be configured to display shelf-life, and to calculate the remaining shelf-life based on a preferred remaining shelf-life of the user.

The Data mode 41 may allow a user to review recently retrieved and analyzed data. The Stats mode 42 may allow a user to review compiled data such as the number of EM devices scanned, number of alarms generated, and the like.

Figure 6C:
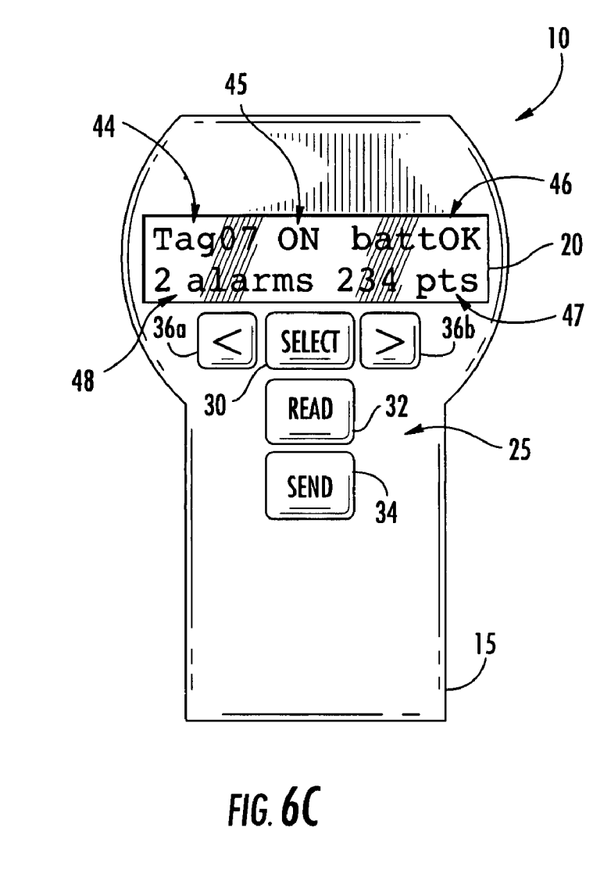

FIG. 6C illustrates an exemplary display output for the reader after it has retrieved data from an EM device. In this embodiment, the reader may be capable of displaying a variety of different outputs including the number of EM devices that have been read (reference number 44), whether the EM device is turned on 45, the status of the EM device's battery 46, the number of data points 47 recorded by the EM device in creating an exposure history for the item, and whether any exposure event and/or depletion of the shelf-life may have occurred. In the illustrated embodiment, the reader is depicted as indicating that two alarms have been generated. In some embodiments, the generation of two alarm signals may signal that both the predetermined threshold for the item may have been exceeded and that the remaining shelf-life of the item may have been depleted. A visual alarm signal may be indicated in many forms including numerical symbology, alpha symbology, other symbols, or combinations thereof. As discussed above, the alarm signal may also include an audible alarm that can be used separately or in combination with the visual alarm signal.

Figure 6D:
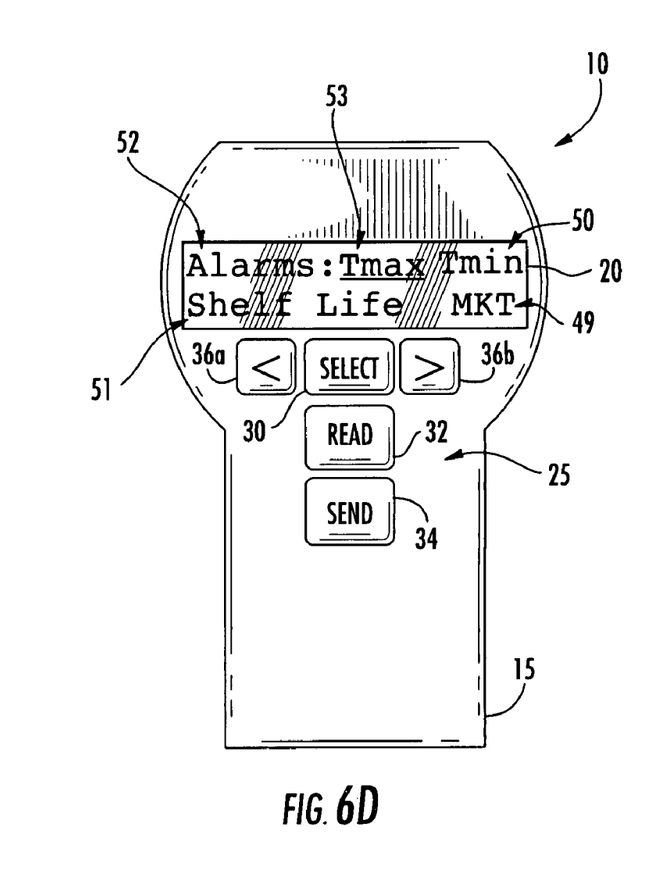

With reference to FIG. 6D, an exemplary output display is shown, which depicts possible alarm signals that the reader may be configured to generate. As shown, in some embodiments, the reader may be configured to generate an alarm if the monitored condition has exceeded a predetermined threshold, for example, a maximum or minimum temperature. As discussed above, the reader may also be configured to generate an alarm signal if data indicates that the shelf-life of the item has expired. The reader in some embodiments may also be configured to generate an alarm signal if the MKT exceeds a predetermined threshold.

Figure 6E:
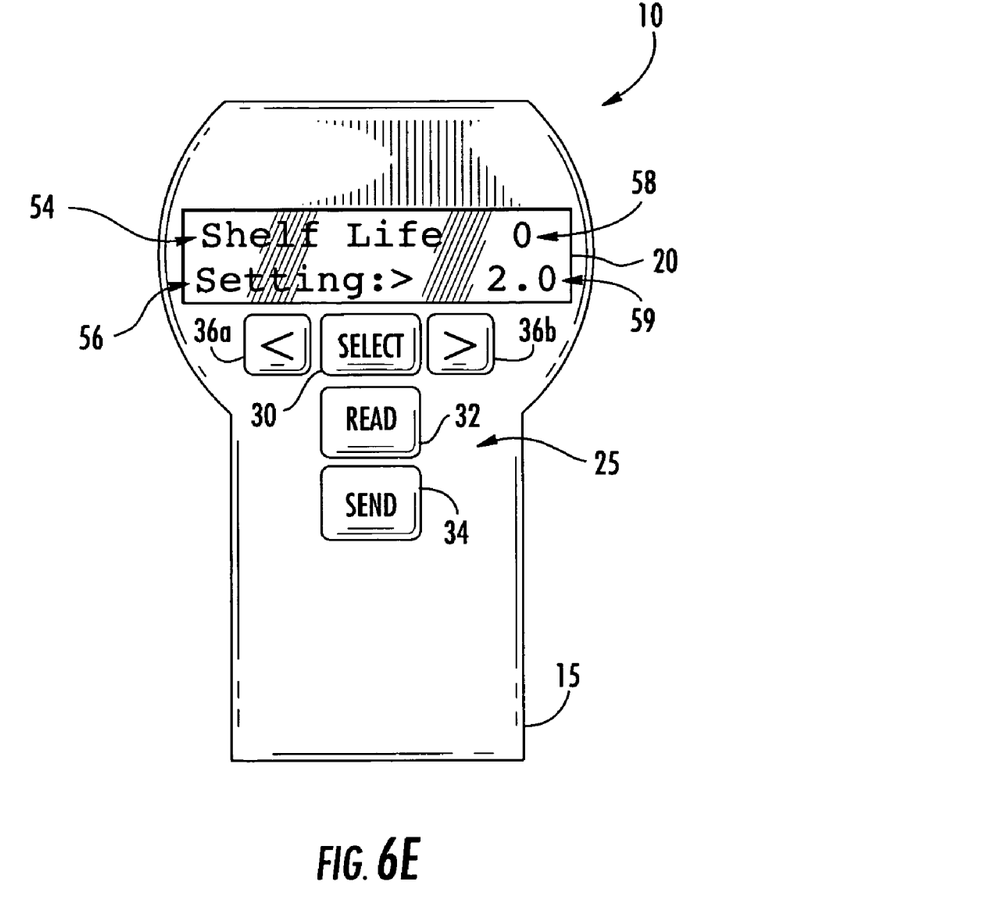

With reference to FIG. 6E, a reader 10 displaying the remaining shelf-life of an item is illustrated. In this embodiment, the reader has been configured to determine and display the remaining shelf-life of an item based on a user's preference. As shown, the visual display 20 may include a visual output adapted to show a user's minimum shelf-life setting 56 in the minimum number of remaining days 59. The visual display may also include a visual output indicating the shelf-life 54 in days remaining 58 before expiration. For example, in the illustrated embodiment, the user has entered a minimum shelf-life preference of greater than 2 days (see reference number 59) and the visual display indicates that the remaining shelf life is zero days, representing an alarm condition.

Figure 7A:
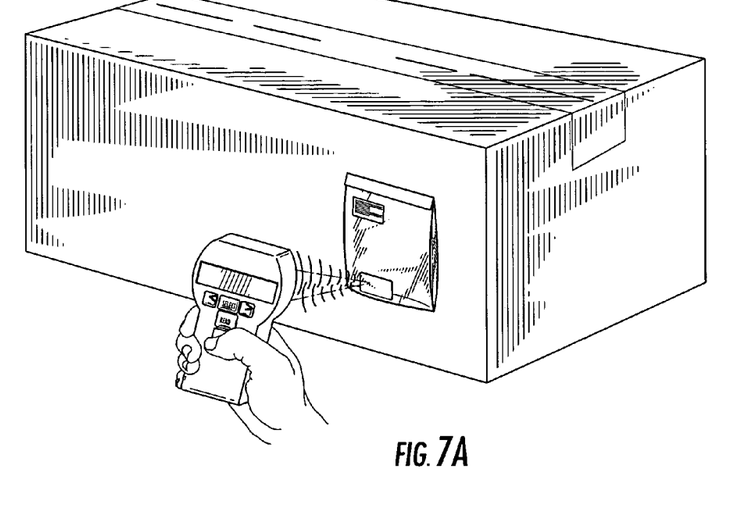
FIGS. 7A and 7B are graphical representations of an individual retrieving data from an electronic monitoring device with the handheld device and transferring the data to a computer.
Figure 7B:
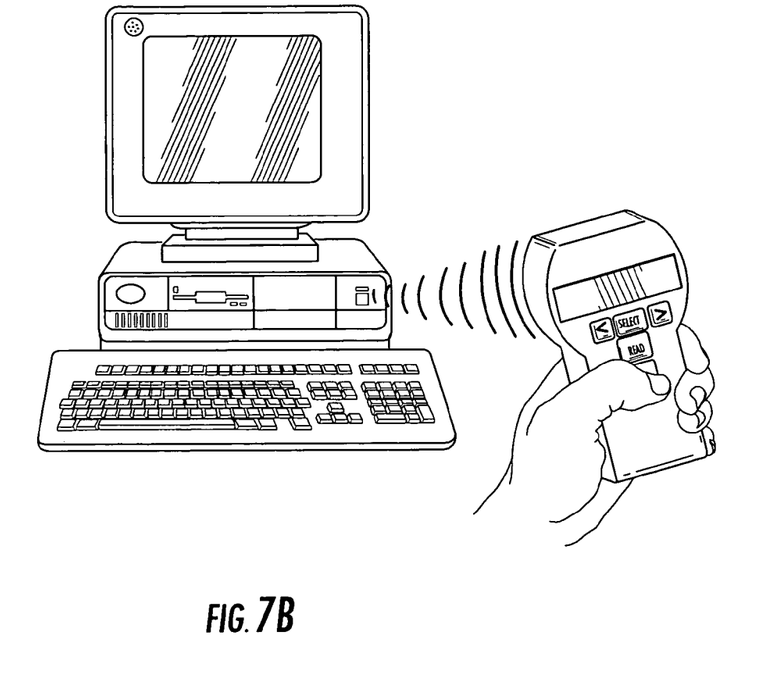

In FIGS. 7A and 7B the reader is illustrated in the process of retrieving data from an EM device and transferring the data from the handheld device to an external computer. In FIG. 7A a user is depicted as positioning the reader in close proximity to an EM device to establish a reading relationship between the reader and the EM device. As used herein a "reading relationship" refers to the proximity of the reader to the EM device that is necessary to establish communication between the reader and the EM device. The user may then retrieve data from the EM device. In this embodiment, the EM device is shown as being disposed in a pouch that is attached to an item, such as a package.

As shown, the EM device is positioned in a monitoring relationship with the item. The exact nature of a monitoring relationship can vary depending upon the environment in which the item is disposed. For instance, in some cases the item may be disposed in an environment where there is minimal variation in the environmental condition being monitored. In this type of environment, the EM device may be disposed at a greater distance from the item without compromising the uniformity in exposure of the EM device. In other environments the monitored condition may fluctuate from point-to-point. To ensure uniformity in exposure in this type of environment, it may be desirable to position the EM device in close proximity to the item to be monitored. In embodiments where the item has an insulation layer, it may be desirable to position the EM device on the same side of the insulation layer as the item is positioned.

FIG. 7B depicts a user transferring the retrieved data from the reader to an external computer. In some embodiments, after the stored data is successfully transferred from the reader to the computer, the associated memory component may be erased and is ready to begin retrieving additional data. After the data has been transferred to the computer, it may be converted from a first file format, such as a native format, into a second file format, such as a standard file format. The data may then be saved for further analysis. In some embodiments, the transferred data may be uploaded to a centralized database or shared with a supplier, distributor, manufacturer, etc. As discussed above, the external computer may include one or more software programs that may be configured to facilitate downloading the data from the reader. In some embodiments, the software program may be configured to control the download process and instruct the reader to erase any data in the associated memory component.

The reader of the present invention may be suited for analyzing environmental conditions to which an EM device has been exposed throughout a distribution system. In some embodiments, the exposure history for an item may be checked at various points throughout the distribution system. If desired, the retrieved data may also be downloaded from the reader to an external computer. The data may then be uploaded to a central database where a comprehensive exposure history from the point of origin to the point of destination may be generated. The reader may also improve the handling of the monitored item at each point where the exposure history is analyzed. For instance, the retrieved data may allow a distributor to quickly ascertain whether the item has been exposed to an environmental condition exceeding a predetermined threshold, or whether any remaining shelf-life of the item has decreased below a preferred minimum value. In such a case, the distributor may be able to make a decision on how the items are to be processed. Such as rejected, disposed of, sold at a reduced price, and the like.

In some embodiments, the invention also includes a method of retrieving, analyzing, and storing data from an EM device with a handheld reader. The handheld device may include a RFID interface for retrieving information from an EM device, a microprocessor for analyzing the retrieved data and producing at least one result based on the data, a means of generating a sensory output to alert a user to the results of the analysis, a memory component for storing the retrieved data and any associated results, and an output for transferring the stored data to an external computer. In one embodiment, the method includes the steps of: retrieving data from an electronic monitoring device with the handheld reader via a wireless interface; analyzing the retrieved data to with the handheld device produce at least one result based on the data; generating a sensory output with the handheld device based on the results of the analysis; storing the retrieved data and any results in the handheld device in a first file format; transferring the data and any results from said handheld device to an external computer; and converting the data and results from a first file format to a second file format. In some embodiments the first file format may be a native file format and the second file format may be a standard file format.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A device for retrieving and analyzing data from a data logger, said device comprising
   a. a first interface adapted for wireless retrieval of data from a data logger;
   b. a control unit in communication with said first interface;
   c. a dedicated operating system comprising one or more executable program modules that are capable of analyzing the data retrieved from a data logger, wherein said dedicated operating system includes a program module that is capable of analyzing the data and determining if an item has been exposed to an environmental condition exceeding a predetermined threshold;
   d. an output device operatively connected to said control unit and capable of producing a sensory output;
   e. a user interface in communication with said control unit and configured to allow a user to input operational commands;
   f. an associated memory component in communication with said control unit and capable of storing data retrieved from a data logger; and
   g. a second interface adapted for downloading stored data from said associated memory component to an external computer.

2. The device according to claim 1, wherein said control unit comprises a microcontroller and said dedicated operating system is embedded therein.

3. The device according to claim 1, wherein said dedicated operating system comprises firmware.

4. The device according to claim 1, wherein the control unit is configured to instruct the output device to generate a sensory output if the item has been exposed to an environmental condition exceeding a predetermined threshold.

5. The device according to claim 1, wherein said dedicated operating system includes a program module that is capable of determining the remaining shelf-life of an item based on data retrieved from a data logger.

6. The device according to claim 5, wherein the program module is capable of determining the remaining shelf-life of an item and comparing said remaining shelf-life to a minimum shelf-life preference.

7. The device according to claim 1, wherein said first interface comprises an RFID transceiver.

8. The device according to claim 1, wherein said sensory output comprises a visual signal, audible signal, or combination thereof.

9. The device according to claim 1, wherein said unit interface comprises two or more buttons including a first button adapted to instruct the device to retrieve data from a data logger and a second button adapted to instruct the device to transfer stored data from the associated memory component to an external computer.

10. A handheld device for retrieving and analyzing data from an electronic monitoring device, said handheld device comprising
    a. an RFID interface adapted for wireless communication with an electronic monitoring device;
    b. a control unit associated with said first interface and configured for analyzing data retrieved from an electronic device, said control unit including a dedicated operating system consisting essentially of one or more executable program modules that are configured to instruct the handheld device to perform one or more of retrieving data from an electronic monitoring device, analyzing the retrieved data, generating a sensory output based on the data, storing the data, transferring the stored data to an external computer, and enabling a user to select an operational mode of said handheld device, and wherein said handheld device is characterized by the absence of a standard operating system;
    c. a visual display in communication with said control unit and adapted to visually indicate device status including whether one or more environmental conditions to which a data logger has been exposed has exceeded a predetermined threshold;
    d. a user interface in communication with said control unit;
    e. an associated memory component in communication with said control unit and capable of storing data retrieved from an electronic monitoring device; and
    f. a second interface adapted for downloading stored data from said associated memory component to an external computer.

11. A handheld device according to claim 10, wherein said associated memory component stores the retrieved data in a native file format.

12. A handheld device according to claim 10, wherein said handheld device is configured for real time analysis of data retrieved from an electronic monitoring device.

13. A method of analyzing data recorded on an electronic monitoring device comprising the steps of:
    positioning the device of claim 1 in a reading relationship with an electronic monitoring device;
    retrieving data from said electronic monitoring device via a wireless interface;
    analyzing the retrieved data with one of said one or more executable programs to determine if one or more environmental conditions has exceeded a predetermined threshold; and
    generating a sensory output if analysis of the retrieved data indicates that a monitored condition may have exceeded a predetermined threshold.

14. A method according to claim 13, wherein the step of analyzing the retrieved data includes executing an algorithm that is configured to automatically:
    analyze the retrieved data to produce at least one result based on the data;
    generate a sensory output based on said at least one result; and
    store the retrieved data and said at least one result in a first file format.

15. A method according to claim 13, further comprising transferring the data stored in a first file format to an external computer having an executable program thereon that is configured to convert the transferred data to a second file format.

16. A method according to claim 13, wherein the first file format comprises a native file format and the second file format comprises a standard file format.

17. A method according to claim 13, further comprising the step of storing the retrieved data in the associated memory component.

18. A method according to claim 13, further comprising transferring the stored data to an external computer.

19. A method according to claim 13, further comprising generating a sensory output if analysis of the retrieved data indicates that a monitored condition has not exceeded a predetermined threshold.

20. A method according to claim 13, wherein the one or more environmental conditions includes temperature, and wherein the predetermined threshold is based on the mean kinetic temperature to which the electronic monitoring device has been exposed.

21. A method according to claim 13, wherein the step of generating a sensory output further comprises displaying an alarm signal on a visual display that is in communication with the control unit and adapted to visually indicate whether the one or more environmental conditions has exceeded a predetermined threshold.

22. A method of retrieving, analyzing, and storing data recorded on an electronic monitoring device comprising the steps of:
  retrieving data from an electronic monitoring device with a handheld reader via a wireless interface, wherein the retrieved data includes an exposure history and calculation parameters for a condition being monitored;
  analyzing the retrieved data with said handheld reader to produce at least one result based on the data;
  generating a sensory output with said handheld reader based on said at least one result;
  storing the retrieved data and said at least one result in said handheld device in a first file format;
  transferring said data from said handheld reader to an external computer; and
  converting said data from said first file format to a second file format.

23. A method according to claim 22, wherein the step of retrieving data further comprises activating a first input on said device that is configured to initiate wireless communication with said electronic monitoring device.

24. A method according to claim 22, wherein the first file format comprises a native file format and the second file format comprises a standard file format.

25. A method according to claim 22, wherein the steps of analyzing the data further includes calculating and displaying the remaining shelf-life of an item associated with said electronic monitoring device.

26. A method according to claim 25, further including the step of generating a sensory output if the remaining shelf-life of said item is expired.

27. A method according to claim 25, wherein the step of calculating the remaining shelf-life further comprises calculating the remaining shelf-life based on a stored minimum shelf-life preference of a user.

28. A method according to claim 22, wherein the electronic monitoring device is associated with an item and the retrieved data indicates that a monitored condition may have exceeded a predetermined threshold, said method further comprising at least one of the following:
  a) disposing of the item;
  b) accepting the item;
  c) returning an item to a supplier; or
  d) selling the item at a discounted price.

* * * * *